3,475,351
ELECTRICALLY CONDUCTIVE ZINC OXIDE
Robert S. Bowman, Pittsburgh, Pa., assignor to St. Joseph Lead Company, New York, N.Y., a corporation of New York
No Drawing. Continuation-in-part of application Ser. No. 520,655, Jan. 14, 1966. This application Nov. 16, 1966, Ser. No. 594,694
Int. Cl. H01b 1/08
U.S. Cl. 252—518                                       6 Claims

ABSTRACT OF THE DISCLOSURE

Non-conductive zinc oxide is converted to an electrically conductive form by subjecting it to the action of a silane compound of the formula $SiX_4$ wherein X is hydrogen or a lower alkyl, aralkyl, monocyclicaryl or naphthenic group at a temperature of from about 300° C. to about 500° C. in a non-oxidizing atmosphere.

---

This application is a continuation-in-part of my application Ser. No. 520,655 filed Jan. 14, 1966, now abandoned.

This invention relates to the production of electrically conductive zinc oxide.

I have found that normally non-conductive zinc oxide, either French or American process, can be converted into an electrically conductive form by subjecting the zinc oxide to the action of silane or its hydrocarbon substitution products at moderately elevated temperatures.

The silane compounds used in the method of the invention can be represented by the formula $SiX_4$, wherein X is hydrogen or a hydrocarbon group such as alkyl, aralkyl, monocyclic aryl or naphthenic groups.

The non-conductive zinc oxide may be treated with the silane compound by passing a stream of non-oxidizing carrier gas (i.e., inert or reducing gases) carrying the silane compound in admixture therewith through a body of the zinc oxide in a suitable container at a temperature from about 300° C. to about 500° C. Typical useful carrier gases include nitrogen, argon, carbon monoxide and hydrogen.

The amounts of silane compounds used in the process are below 10% by weight of the zinc oxide and typically are in the range from about one percent to about five percent by weight. The silane compounds are introduced into the carrier gas by injection or by passing the gas through a body of the silane compound maintained at a temperature effective to vaporize the silane compound at the desired rate.

The treated zinc oxide products thus obtained have the fine particle size of the starting material, have low specific resistances and are resistant to heat sintering. They are either white or light tan in color and are either hydrophilic or hydrophobic depending on the silane used. In general, treatment with organo-substituted silanes results in hydrophobic products.

The method of the invention can be carried out in a single stage at moderate temperatures. No pretreatment other than de-aeration is necessary.

In the following examples illustrating the principles of the invention, the resistivities of the products to direct current are given in ohm-cm. units.

Example 1

A non-conductive zinc oxide in a heatable reaction tube is purged of air at 450° C. in a stream of dry argon. Approximately 5 percent by weight, based on the zinc oxide, of silane ($SiH_4$) vapor is then added to the argon stream over a period of about 20 minutes. The product after cooling to room temperature in an argon atmosphere is light tan in color and has a resistivity of $1.2 \times 10^2$ ohm-cm. It is easily water wetted.

Example 2

A non-conductive zinc oxide is subjected to the procedure of Example 1 substituting methylsilane ($CH_3SiH_3$) for silane. The product is near-white with a resistivity of $1.2 \times 10^2$ ohm-cm. It is not water wettable.

Example 3

A non-conductive zinc oxide was treated as in Example 1 with phenylsilane ($C_6H_5SiH_3$) in a stream of dry nitrogen at 400° C. The product is white and has a resistivity of $1.2 \times 10^3$ ohm-cm. It is not water wettable.

A similar product is obtained when dry hydrogen is substituted for the nitrogen as carrier gas in this example.

A similar product ($3.5 \times 10^3$ ohm-cm resistivity) is also obtained when dry carbon monoxide gas is employed as the carrier gas at a furnace temperature of 350° C. A further decrease in furnace temperature, to 300° C., under otherwise identical conditions, produces a white, hydrophobic product with a resistivity of $3.2 \times 10^4$ ohm-cm.

Example 4

A non-conductive zinc oxide was treated as in Example 1 with tetramethylsilane ($Me_4Si$) in a stream of dry nitrogen at 500° C. The product is off-white, water-wettable, and has a resistivity of $2.4 \times 10^3$ ohm-cm.

I claim:
1. A method of preparing electrically conductive zinc oxide which comprises subjecting zinc oxide to the action of a silane compound of the formula $SiX_4$ wherein X is hydrogen or a lower alkyl, aralkyl, monocyclic aryl or naphthenic group at a temperature of from about 300° C. to about 500° C. in an inert or reducing atmosphere.
2. A method as defined in claim 1 wherein the silane compound is brought into contact with the zinc oxide in admixture with an inert or reducing gas.
3. A method as defined in claim 1 wherein the silane compound is tetrahydrosilicon.
4. A method as defined in claim 1 wherein the silane compound is methylsilane.
5. A method as defined in claim 1 wherein the silane compound is phenylsilane.
6. A method as defined in claim 1 wherein the silane compound is tetramethylsilane.

References Cited

UNITED STATES PATENTS 3,155,504   11/1964   Damm et al.

LEON D. ROSDOL, Primary Examiner

J. D. WELSH, Assistant Examiner

U.S. Cl. X.R.

23—147; 106—296; 117—100